United States Patent
Dumont et al.

[19]

[11] Patent Number: 6,154,642
[45] Date of Patent: Nov. 28, 2000

[54] DIGITAL WIRELESS COMMUNICATIONS SYSTEM AND A WIRELESS RADIO STATION WITH TIMING ERROR COMPENSATION BASED ON AN ACCUMULATED TIMING ERROR BETWEEN RECEPTION OF MESSAGES

[75] Inventors: Frederik A. J. Dumont; Cornelis C. M. Schuur, both of Eindhoven; Hermanus J. M. Vos, Nijmegen, all of Netherlands

[73] Assignee: U.S. Philips Corporation, New York, N.Y.

[21] Appl. No.: 08/951,702

[22] Filed: Oct. 16, 1997

[30] Foreign Application Priority Data

Oct. 24, 1996 [EP] European Pat. Off. .............. 96202962

[51] Int. Cl.[7] ..................................................... H04M 11/00
[52] U.S. Cl. ........................... 455/403; 455/574; 455/502
[58] Field of Search ................................. 455/574, 455, 455/38.3, 403, 343, 573, 502; 370/100.1, 505, 350, 311, 516, 517; 375/12, 356, 357, 371; 179/15

[56] References Cited

U.S. PATENT DOCUMENTS 3,562,432  2/1971  Gabbard ..................................... 179/15
4,964,121  10/1990  Moore ..................................... 370/100.1
5,297,165  3/1994  Ueda et al. ................................. 375/12
5,428,820  6/1995  Okada et al. ............................ 455/38.3
5,625,882  4/1997  Vook et al. .............................. 455/38.3
5,666,366  9/1997  Malek et al. ............................. 370/505
5,790,939  8/1998  Malcolm et al. ........................ 455/12.1
5,898,685  4/1999  Schnizlein ................................ 370/350
5,917,868  6/1999  Kuusinen ................................. 375/354

*Primary Examiner*—Daniel S. Hunter
*Assistant Examiner*—Charles Chow

[57] ABSTRACT

In a time division multiple access wireless communication system, a wireless radio station performs a timing error compensation method. The wireless radio station receives messages including a synchronisation pattern. The wireless radio station adopts a power down mode between reception of messages, and accumulates a timing error representing an accumulated difference between expected times of arrival of the synchronisation patterns and actual times of arrival of the synchronisation patterns, during a predetermined time interval between reception of successive messages and before an expected reception of a next message. Thereafter, the wireless radio station at least substantially undoes the accumulated timing error, before the expected reception of the next message such that the timing error is compensated before the expected reception of the next message.

20 Claims, 3 Drawing Sheets

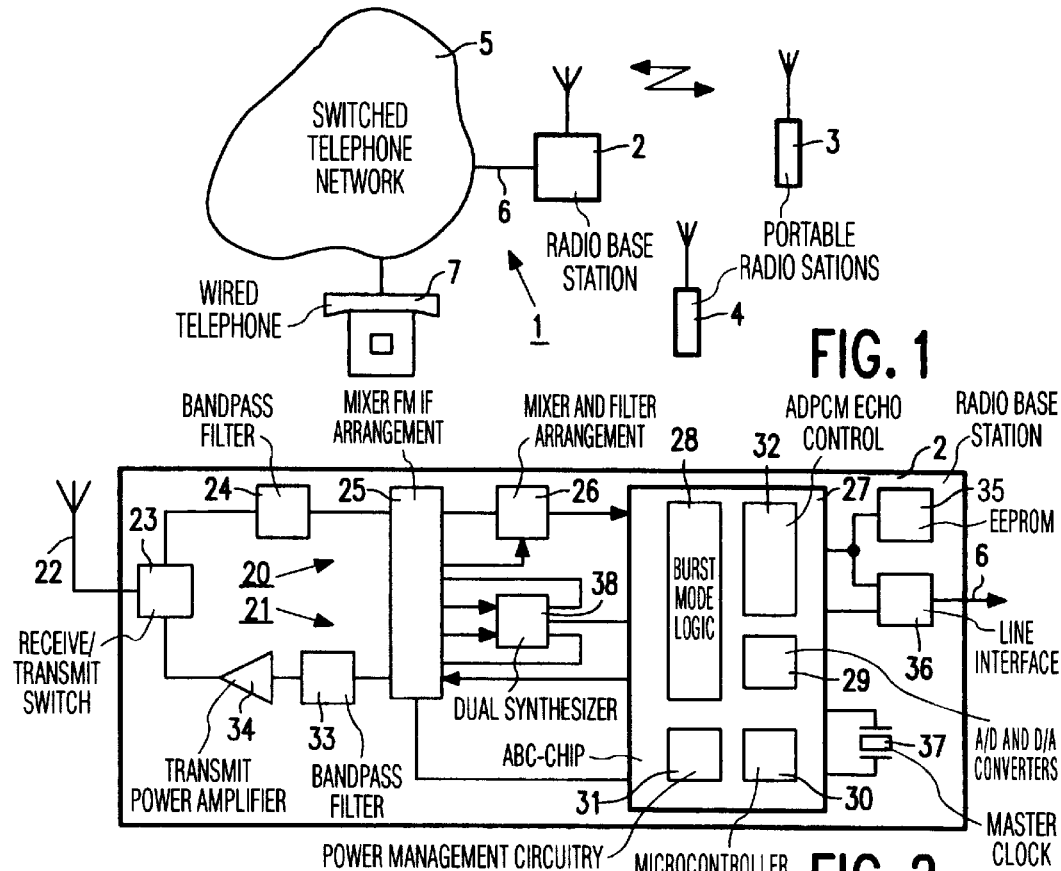
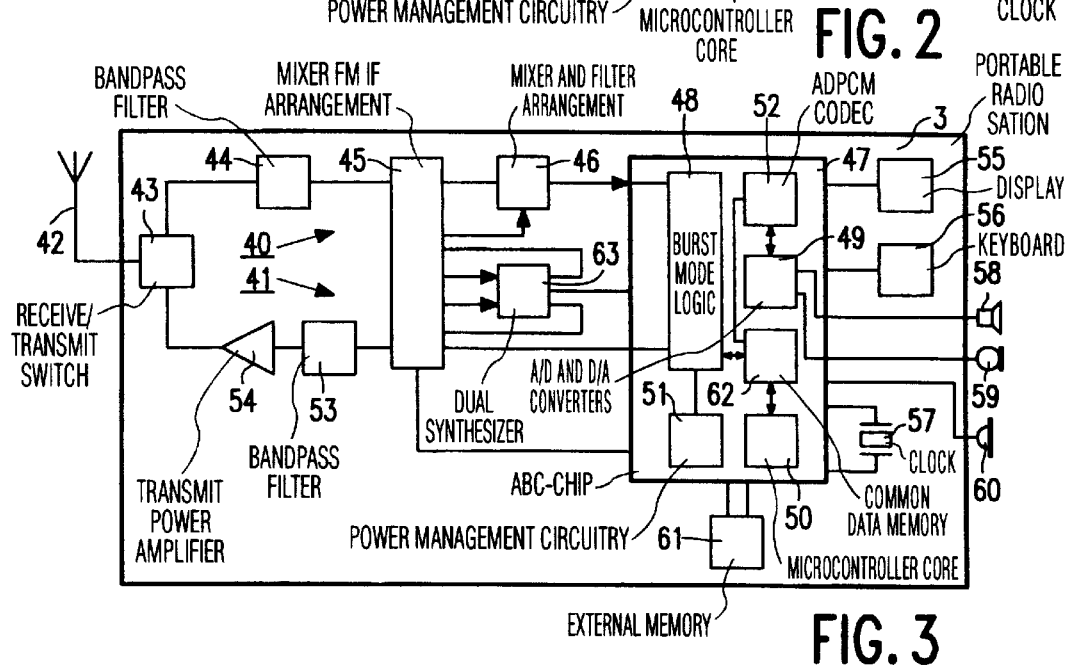

DIGITAL WIRELESS COMMUNICATIONS SYSTEM AND A WIRELESS RADIO STATION WITH TIMING ERROR COMPENSATION BASED ON AN ACCUMULATED TIMING ERROR BETWEEN RECEPTION OF MESSAGES

BACKGROUND OF THE INVENTION

The present invention relates to a digital wireless communications system comprising a first wireless radio station coupled to a network and a second wireless radio station arranged for wireless communication with the first wireless station via at least one time slot of a communications frame, in which system the first station comprises a master clock and is arranged to transmit messages to the second station comprising a synchronisation pattern, and in which system the second station comprises power management circuitry, local timing circuitry, and is at least controllable so as to operate in an active reception mode and in a power down mode, whereby the power down mode is adopted between reception of messages outside the active mode. Such a digital wireless communications system can be a FD/TDMA cordless telephony system comprising cordless handsets as wireless radio stations, or any other suitable digital wireless communication system in which date are exchanged via time slots in transmission frames.

The present invention further relates to a wireless radio station for use in such a system.

A digital wireless communication system of the above kind is known from the Philips Data Handbook IC17, "Semiconductors/Wireless Communications", 1996, pp. 34–37. On page 37, a blockdiagram of a DECT handset is shown. This handset comprises a double superheterodyne receiver for receiving message from the cordless base station shown on page 36. Furthermore, so-called Burst Mode Logic is shown for exchanging bursts of information between a common data memory and the transceiver part. The burst are transmitted and received in time slots of communications frames. The handset synchronizes to synchronisation patterns send by the base station, the base station acting as a master station and the handset acting a slave station. The handset can adopt an active mode and a power down or sleep mode, inter alia. The shown power management block controls various parts of the handset to be switched off when the handset adopts the power down mode, such a power management being well known in the art. The so-called ABC (ADPCM-Codec, Burst Mode Controller, and microController) chip of Philips type PCD509x shown on page 37 is readily available onto the market. In DECT, the base station transmits paging messages for informing handsets that there is an incoming call. In order that the handset becomes aware of such paging messages when in power down mode and also to keep in synchronisation with the base station it is necessary that the handset's receiver is switched on for receiving these paging messages and for synchronisation purposes. Local timing circuitry controls switching on of the receiver, inter alia. The synchronisation pattern in the paging message is used to undo an accumulated timing error between the reception of paging messages. The timing error is caused by inaccuracies and drift of the local timing circuitry with respect to the master clock and can be considerable in power down mode. Herewith, to catch the synchronisation pattern, a width of a correlation window should be considerable too. A broad correlation window, however, can give rise to detection of false synchronisation patterns. Detection of a false synchronisation makes correct synchronisation an even more complex problem.

OBJECTS AND SUMMARY OF THE INVENTION

It is an object of the present invention to provide a digital wireless communications system.

To this end the digital wireless communications system is characterized in that the second station comprises register means for accumulating a timing error representing an accumulated difference between expected times of arrival of the synchronisation patterns and actual times of arrival of the synchronisation patterns, during a predetermined time interval between reception of messages, and that the second station comprises means for at least substantially undoing the accumulated timing error before an expected reception of a next message by controlling the local timing circuitry in accordance with the accumulated timing error such that the timing error is compensated for just before the expected reception of the next message. Herewith, it is achieved that, notably when the handset is in power down mode, the timing error around the time a message is expected is very small so that a narrow correlation window for catching the synchronisation word suffices. The present invention is based upon the insight that any timing error that has accumulated over a given period of time is undone before a predetermined, time-critical operation such as the reception of a paging message is executed.

In an embodiment of a digital wireless communications system according to the present invention, the local timing circuitry is controlled within a period which is short with respect to the period between two successive messages. Herewith, maximum power savings are achieved and thus the handset's standby-time is increased. Considerable increase in standby-time is a great economical advantage. Undoing of an accumulated timing error can be chosen anywhere in the interval between two active periods of reception as long as it is achieved that the accumulated error is as small as possible just before the predetermined, time-critical operation.

In an embodiment of a digital wireless communications system according to the present invention, a timing error is measured over at least one frame when the second station is in active mode, and as an initial estimation of the accumulated timing error the timing error measured during said one period is multiplied by the number of frames between the messages as received when the second station adopts the power down mode. Herewith, it is achieved that the timing error correction according to the present invention has a proper initial state before going into power down mode.

In an embodiment of a digital wireless communications system according to the present invention, a power down mode is stepwise and substantially prolonged after at least one compensation step at a time. Herewith, power savings can be gradually increased when there are no incoming or outgoing calls. Within the limitations of the capacity of the register means a very long standby-time can thus be achieved during which the energy consumption of the handset is very low.

In an embodiment of a digital wireless communications system according to the present invention, a residual timing error is determined after a compensation step and after reception of a message, and is stored in the register means before further accumulation of the timing error to be compensated for before the next message. Herewith, the timing error compensation can be made very accurate, in the order of a few clock cycles of the local timing circuitry. Herewith, also slow variations in the master clock and the local timing circuitry can be eliminated.

In an embodiment of a digital wireless communications system according to the present invention, the means for undoing the accumulated timing error are arranged to undo the accumulated timing error in a number of undoing steps. Herewith, it is prevented that in case of very long standby-times, the register means becomes overloaded, i.e., undoing is distributed over the standby-period.

BRIEF DESCRIPTION OF THE DRAWINGS

The present invention will now be described, by way of example, with reference to the accompanying drawings, wherein FIG. 1 schematically shows a block diagram of a digital wireless communications system according to the present invention, FIG. 2 shows a first wireless radio station for a system according to the present invention, FIG. 3 shows a second wireless radio station for a system according to the present invention.

Throughout the figures the same reference numerals are used for the same features.

DETAILED DESCRIPTION OF THE EMBODIMENTS

Figure 4:
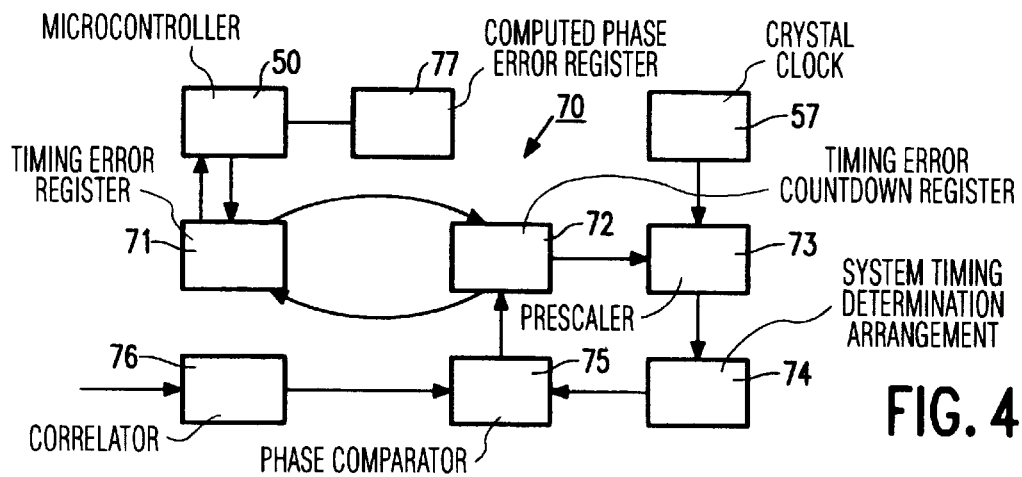
FIG. 4 shows timing error compensation means according to the present invention.

FIG. 1 schematically shows a block diagram of a digital wireless communications system I according to the present invention. By way of example a DECT (Digital European or Enhanced Cordless Telecommunications) system will be described, but the system can be any other digital wireless communications system. For a more detailed description of DECT referred is to the handbook "Cordless Telecommunications in Europe", H. W. Tuttlebee, Springer Verlag, 1990, Appendix 3, pp. 273–284. On page 278 of this handbook a multicarrier TDMA (Time Division Multiple Access) TDD (Time Division Duplex) DECT frame structure of twelve timeslots in uplink and downlink direction on the air interface is shown, such a frame structure being well-known in the art. The system 1 comprises a DECT radio base station 2 as a first wireless radio station, and a plurality of portable DECT radio stations 3 and 4 as second wireless radio stations for communicating with the radio base station 2. The radio base station 2 is coupled to a switched telephony network 5 via a telephone line 6. The network 5 can be a public or a private network. The network 5 can be an analog or a digital telephony network. Furthermore, a wired telephone 7 of a fixed network subscriber is shown which is coupled to the switched network 5.

FIG. 2 shows a first wireless radio station as the radio base station 2 for a system according to the present invention. The radio base station 2, which is a multi-channel FD/TDMA device according to the DECT Standard, comprises a receive path 20 and a transmit path 21 both being coupled to an antenna 22 via a receive/transmit switch 23. The receive path 20 comprises a bandpass filter 24 coupled to a first mixer FM IF arrangement 25 with amplifiers and local oscillators. Such an arrangement can be an IC type UAA2067G readily available onto the market. The receive path 20 comprises a further mixer and filter arrangement 26. Such a receive path 20 forms a double superheterodyne RF receiver. At output side, the mixer 26 is coupled to a so-called ABC-chip 27 (ADPCM-Coding, Burst Mode Logic, and microController) basically having the functionality of IC-type PCD5092/94. The basic ABC-chip 27 comprises Burst Mode Logic 28 operating as a channel controller in accordance with the DECT Standard. One of the functions of the channel controller 28 is to exchange data bursts between a radio front end's channel resource, i.e. a time slot on a given carrier, and the telephone line 6 via A/D- and D/A-converters 29. The ABC-chip further comprises a 8051 microcontroller core 30 and power management circuitry 31. The ABC-chip 27 further comprises ADPCM echo control 32. The radio base station 2 further comprises a dual synthesizer 38 which is coupled to the first receive/transmit mixer 25, a bandpass filter 33 and transmit power amplifier 34 in the transmit path 21, and an EEPROM 35 and a line interface 36 which are coupled to the ABC-chip. A crystal master clock 37, for DECT running at a nominal frequency of 13.824 MHz, is controlling the ABC-chip 27. Basically, the radio base station 2 is disclosed in said Philips Data Handbook IC17.

FIG. 3 shows a second wireless radio station as the portable DECT radio station 3 for a system according to the present invention. Basically, such a portable is disclosed on page 37 of said Philips Data Handbook IC17. The portable radio station 3, which is a multi-channel FD/TDMA device according to the DECT Standard, comprises a receive path 40 and a transmit path 41 both being coupled to an antenna 42 via a receive/transmit switch 43. The receive path 40 comprises a bandpass filter 44 coupled to a first mixer FM IF arrangement 45 with amplifiers and local oscillators. Such an arrangement can be an IC type UAA2067G readily available onto the market. The receive path 40 comprises a further mixer and filter arrangement 46. Such a receive path 40 forms a double superheterodyne RF receiver. At output side, the mixer 46 is coupled to a so-called ABC-chip 47 as described before, basically having the functionality of IC-type PCD5090/91. As will be described in the sequel, this basic ABC-chip is modified to carry out the timing error compensation and power saving as of the present invention. The basic ABC-chip 47 comprises Burst Mode Logic 48 operating as a channel controller in accordance with the DECT Standard. One of the functions of the channel controller 48 is to exchange data bursts between a radio front end's channel resource, i.e. a time slot on a given carrier, and base band devices via A/D- and D/A-converters 49. The ABC-chip further comprises a 8051 microcontroller core 50 and power management circuitry 51. The microcontroller 50 is programmed to carry out timing error correction and power management in accordance with the present invention. The ABC-chip 47 further comprises an ADPCM Codec 52. The portable radio station 3 further comprises a dual synthesizer 63 which is coupled to the first receive/transmit mixer 45, a bandpass filter 53 and transmit power amplifier 54 in the transmit path 41, and a display 55 and a keyboard 56 which are coupled to the ABC-chip. Local timing circuitry comprising a crystal clock 57, for DECT running at a nominal frequency of 13.824 MHz, is controlling the ABC-chip 47. Furthermore, the portable radio station 3 comprises a loudspeaker 58, a microphone 59, buzzer or ringer 60, and external memory 61 coupled to the basic ABC-chip 47. A common data memory 62 is provided in the ABC-chip 47 which is coupled to the channel controller 48, to the microcontroller 50, and to the ADPCM Codec 52.

FIG. 4 shows timing error compensation means 70 according to the present invention modifying the basic ABC-chip 47. The timing error compensation means 70 comprises the microcontroller 50, a timing error or phase error register 71, a timing error or phase error countdown register 72, a system clock divider or prescaler 73 controlled by the microcontroller 50 and the timing error countdown register, the crystal clock 57 of which the frequency is divided by the prescaler 73, a system timing determination arrangement 74 embodied in the programmed microcontroller 50, a phase comparator 75, and a correlator 76. The correlator 76 is arranged for correlating a predetermined synchronization pattern with received synchronisation patterns so as to determine the actual times of arrival of the sync patterns. The system timing determination arrangement 74 provides expected times of arrival of synchronization patterns and at its output, the comparator 75 provides a phase error between the actual and expected times of arrival. The prescaler 73 is controlled such that the internal timing is slowed down or advanced in accordance to the phase error. The phase error is determined each time a synchronization pattern is detected, in power down mode at a relatively large distance. The microcontroller 50 only 'sees' the timing error register 71. At every syncword detection the phase comparator 75 will store the timing difference into the phase error countdown register 72. Then, the contents of the phase error countdown register 72 is copied into the timing error register 71. Thus, value of the timing error register 71 will not change until the next synchronization event occurs. When counting down the register 72 while controlling the prescaler 73 so as to apply clock correction, the contents of the register 71 remains unchanged. Herewith, the microcontroller 50 can determine a residual phase error after correction. A computed phase error register 77 is coupled to the microcontroller 50.

Figure 5:
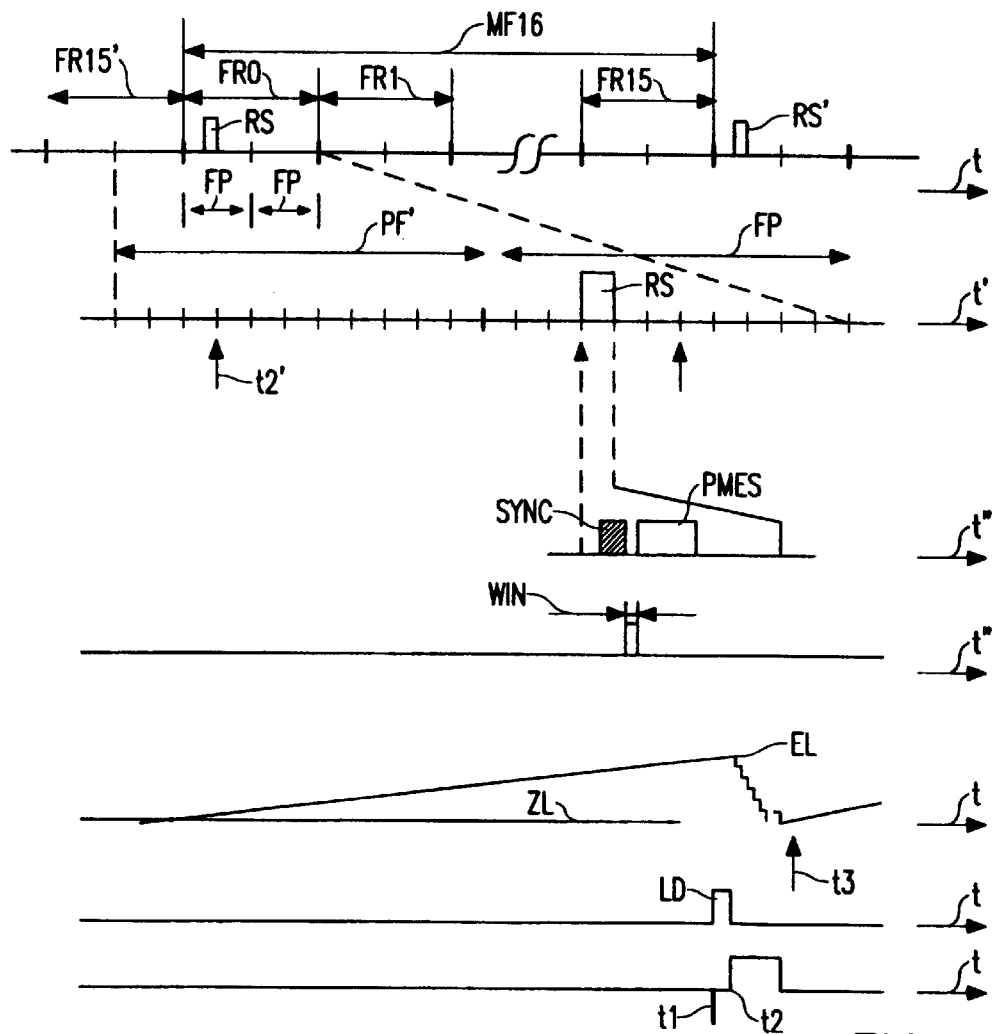
FIG. 5 shows a timing diagram of a first embodiment of timing error compensation according to the present invention.

FIG. 5 shows a timing diagram of a first embodiment of timing error compensation according to the present invention as a function of time t. Shown is a situation in which the portable radio station 3 has adopted a power down mode in which every multiframe MF16 of sixteen DECT frames a synchronization pattern is searched. Such a multiframe MF16 comprises frames FR0, FR1, ..., FR15 with time slots for exchanging information from a DECT fixed part to a portable an vice versa, indicated with FP and PF, respectively. On an enlarged time scale t' these time slots are shown, namely twelve PF' time slots for a frame FR15' preceding the frame FRO, and twelve FP time slots for the frame FRO. In power down mode, data reception is only switched on during a slot RS and RS' per multiframe. This is indicated on a still further enlarge time scale t" showing a received synchronization pattern SYNC followed by a paging message PMES. When applying timing error correction as according to the present invention, the correlator 76 only has to operate during a small time window WIN. On the non-enlarged time scale t, accumulation of the timing error is shown between the detection of synchronization patterns SYNC in power down mode. With respect to a zero-error level ZL, the timing error has accumulated to a level EL at an instant t1. According to the present invention, before an expected reception of a next synchronization pattern in a next multiframe, the prescaler 73 is controlled such that just before the expected next synchronization pattern the timing error has been reduced substantially or virtually to a zero level. This is done by counting down the register 72. The phase error can be stored in units of clock cycles of the clock 57. At an accuracy of the master clock of 10 ppm and of the clock 57 of 25 ppm, typically being DECT maximum values, the maximum timing error in a 16-frame power down mode amounts 78 clock cycles. If an error of two clock periods can be undone per frame of 125 microseconds, at least 40 speech frames in advance of the reception of the next synchronization pattern or 12 time slots spanning 5 milliseconds will be needed to correct the accumulated phase error. This is shown in FIG. 5 on the time scale t' with the instant t2' and on the time scale t with the instant t2. Furthermore, a load pulse LD is shown for loading the accumulated phase error into the register 71 at the instant tl. At the instant t3, in principle the register 72 is counted down to zero. An undo-period UP is shown. Thereafter, the phase error builds up again. It should be realized that the clock 57 remains unchanged. Timing error correction is also done when the station 3 is in active mode. Then undoing has to be done relatively slow, e.g., with 2 clock periods per speech frame. In power down mode undoing can be done much faster because no speech signal is present then. In the embodiment given undoing can be done with a speed of as much as 144 clock periods per length of a speech frame. In order to cope with initialization problems of the timing error determination, as an initial estimation of the phase error a timing error is determined over just a single frame whereas the portable station remains active, i.e., in DECT, a timing error over a time interval of 10 msec is determined. For a 16-frame-multiframe power-down-mode, as an initial multiframe timing error estimation, the single-frame timing error is multiplied by 16. Thereafter, the so-called pre-emptive correction according to the present invention is applied. For a surprisingly very accurate correction, a residual timing error is determined after reception of the paging message PMES, in power down mode. This is the residual error left after basic pre-emptive timing error correction. The so determined residual error is added to the timing error determined between two sync patterns just before pre-emptive error correction. Herewith, a very accurate correction is achieved and the window WIN can be made as small as 2 bit-times as a minimum. The powerdown period can then easily be prolonged to a 64-frame-multiframe mode, or even to much larger periods. When in power down mode or sleep mode, considerable power savings are achieved, depending on the specific hardware used. In the embodiment given, the registers 71, 72 and 77 cooperate as follows. When the station 3 is still in active mode it receives a message per 10 msec. The register 72 stores the measuring of the timing or phase error over a single DECT frame. Immediately after measurement, the phase error is copied from the register 72 into the register 71. In the slot RS, the microcontroller 50 reads the measured phase error from the register 71, multiplies the measured phase error by 16 and stores the so calculated phase error into the register 77. Then, the station 3 goes into power down mode. At the software pulse LD, the contents of the register 77 is copied into the register 71 and also immediately copied into the register 72. In the undo period UP correction is done by counting down the register 72 while influencing the prescaler 73 as described. Between the end of the undoing period UP and the detection of the next synchronization pattern, the phase error builds up and is stored in both the registers 71 and 72, i.e., the registers 71 and 72 contain the residual timing error. During analysis of the paging message PMES, the microcontroller 50 read the residual timing error from the register 71 and adds the residual error to the contents of the register 77. At a next pulse LD, the computed phase error is copied into the registers 72 and 71 again. Herewith, over a period small as a single powerdown period a residual error caused by rounding errors converges to zero. Thereafter, the only remaining but small residual errors are caused by slow drift phenomena due to temperature variations, or the like. After one powerdown period the window WIN can thus be made very small.

Figure 6:
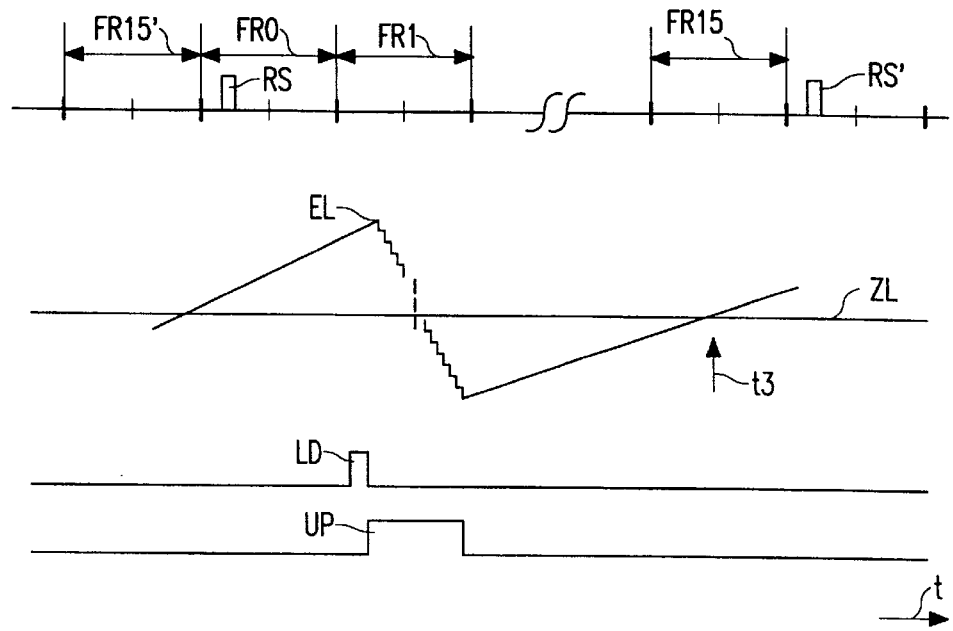
FIG. 6 shows a timing diagram of a second embodiment of timing error compensation according to the present invention.

FIG. 6 shows a timing diagram of a second embodiment of timing error compensation according to the present invention. As can be seen, undoing the accumulated phase error starts in between reception of messages RS and RS'. At the end of the undo-period UP, undoing has gone beyond the zero level ZL but at the instant t3, the phase error is at zero level ZL again.

Figure 7:
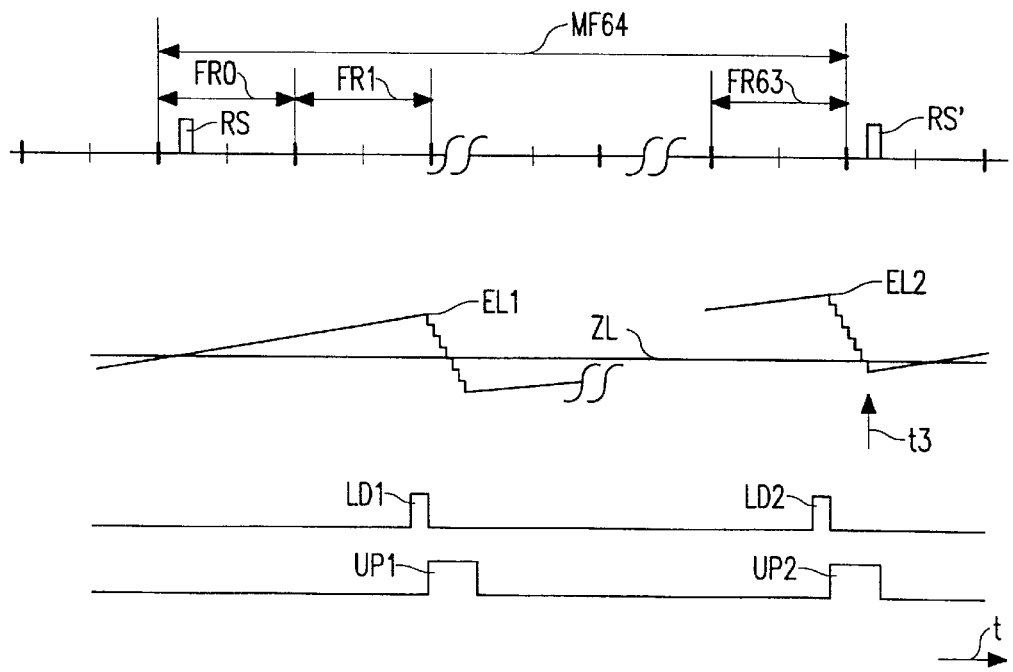
FIG. 7 shows a timing diagram of a third embodiment of timing error compensation according to the present invention.

FIG. 7 shows a timing diagram of a third embodiment of timing error compensation according to the present invention. Shown is a 64-frame-period power down mode during which messages are only detected every 64 frames, a multiframe MF64 containing frames FR0, FR1, . . . , FR63. In this embodiment undoing of an accumulated phase error is distributed over two undoing periods UP1 and UP2 in which error levels EL1 and EL2 are undone, respectively. Undoing is initiated by the load pulses LD1 and LD2, respectively. At the instant t3, just before reception of the next synchronization pattern, the timing error is virtually zero. Distribution over more than one undoing period overcomes the problem that the registers might become overloaded when applying very long power down periods.

What is claimed is:

1. A digital wireless communications system comprising a first wireless radio station coupled to a network and a second wireless radio station arranged for wireless communication with the first wireless station via at least one time slot of a communications frame, in which system the first station comprises a master clock and is arranged to transmit messages to the second station comprising a synchronisation pattern, and in which system the second station comprises power management circuitry, local timing circuitry, and is at least controllable so as to operate in an active reception mode and in a power down mode, whereby the power down mode is adopted between reception of messages outside the active mode, the second station comprises register means for accumulating a timing error representing an accumulated difference between expected times of arrival of the synchronisation patterns and actual times of arrival of the synchronisation patterns, said timing error being accumulated during a predetermined time interval between reception of messages and before an expected reception of a next message, and the second station comprises means for at least substantially undoing the accumulated timing error before the expected reception of the next message by controlling the local timing circuitry in accordance with the accumulated timing error such that the timing error is compensated for just before the expected reception of the next message, said controlling of the local timing circuitry being performed within a first time period that is short with respect to a second time period between two successive messages, and said first time period ending at an instant before the expected reception of the next message, said instant being such that a ratio of a difference between said instant and a reception instant of a message preceding the next message, and of a difference between a reception instant of the next message and the reception instant of the message preceding the next message is close to one.

2. A digital wireless communications system according to claim 1, wherein a timing error is measured over at least one frame when the second station is in active mode, and as an initial estimation of the accumulated timing error the timing error measured during said one period is multiplied by the number of frames between the messages as received when the second station adopts the power down mode.

3. A digital wireless communications system according to claim 2, wherein a power down mode is stepwise and substantially prolonged after at least one compensation step at a time.

4. A digital wireless communications system according to claim 1, wherein a residual timing error is determined after a compensation step and after reception of a message, and is stored in the register means before further accumulation of the timing error to be compensated for before the next message.

5. A digital wireless communication system according to claim 1, wherein the means for undoing the accumulated timing error are configured to undo the accumulated timing error in a number of undoing steps.

6. A wireless radio station for use in a communications system arranged for wireless communication with another wireless radio station via at least one time slot of a communications frame, in which system the other radio station comprises a master clock and is arranged to transmit messages to the wireless station comprising a synchronisation pattern, and in which system the wireless radio station comprises power management circuitry, local timing circuitry, and is at least controllable so as to operate in an active reception mode and in a power down mode, whereby the power down mode is adopted between reception of messages outside the active mode, the wireless radio station comprises register means for accumulating a timing error representing an accumulated difference between expected times of arrival of the synchronisation patterns and actual times of arrival of the synchronisation patterns, said timing error being accumulated during a predetermined time interval between reception of messages and before an expected reception of a next message, and the wireless radio station comprises means for at least substantially undoing the accumulated timing error before the expected reception of the next message by controlling the local timing circuitry in accordance with the accumulated timing error such that the timing error is compensated for just before the expected reception of the next message, said controlling of the local timing circuitry being performed within a first time period that is short with respect to a second time period between two successive messages, and said first time period ending at an instant before the expected reception of the next message, said instant being such that a ratio of a difference between said instant and a reception instant of a message preceding the next message, and of a difference between a reception instant of the next message and the reception instant of the message preceding the next message is close to one.

7. In a digital wireless communication system comprising a first wireless radio station coupled to a network and a second wireless radio station arranged for wireless communication with the first wireless station through at least one time slot of a communication frame, said second wireless radio station being controllable so as to operate in an active reception mode and a power down mode, a method for undoing a timing error, said method being used in said second wireless radio station and said method comprising:

receiving messages comprising a synchronisation pattern;

adopting said power down mode between reception of messages;

accumulating a timing error representing an accumulated difference between expected times of arrival of said synchronisation patterns and actual times of arrival of said synchronisation patterns, during a predetermined time interval between reception of successive messages and before an expected reception of a next message; and at least substantially undoing said timing error before said expected reception of said next message such that said timing error is compensated before said expected reception of said next message, said undoing being performed within a first time period that is short with respect to a second time period between two successive messages, and said first time period ending at an instant before the expected reception of the next message, said instant being such that a ratio of a difference between said instant and a reception instant of a message preceding the next message, and of a difference between a reception instant of the next message and the reception instant of the message preceding the next message is close to one.

8. A digital wireless communications system comprising a first wireless radio station coupled to a network and a second wireless radio station arranged for wireless communication with the first wireless station via at least one time slot of a communications frame, in which system the first station comprises a master clock and is arranged to transmit messages to the second station comprising a synchronisation pattern, and in which system the second station comprises power management circuitry, local timing circuitry, and is at least controllable so as to operate in an active reception mode and in a power down mode, whereby the power down mode is adopted between reception of messages outside the active mode, the second station comprises register means for accumulating a timing error representing an accumulated difference between expected times of arrival of the synchronisation patterns and actual times of arrival of the synchronisation patterns, said timing error being accumulated during a predetermined time interval between reception of messages and before an expected reception of a next message, and the second station comprises means for at least substantially undoing the accumulated timing error before the expected reception of the next message by controlling the local timing circuitry in accordance with the accumulated timing error such that the timing error is compensated for just before the expected reception of the next message, said controlling of the local timing circuitry being performed within a first time period that is short with respect to a second time period between two successive messages, and said first time period ending at an instant before the expected reception of the next message, said instant being such that a ratio of a difference between said instant and a reception instant of a message preceding the next message, and of a difference between a reception instant of the next message and the reception instant of the message preceding the next message is substantially smaller than one.

9. A wireless radio station for use in a communications system arranged for wireless communication with another wireless radio station via at least one time slot of a communications frame, in which system the other radio station comprises a master clock and is arranged to transmit messages to the wireless station comprising a synchronisation pattern, and in which system the wireless radio station comprises power management circuitry, local timing circuitry, and is at least controllable so as to operate in an active reception mode and in a power down mode, whereby the power down mode is adopted between reception of messages outside the active mode, the wireless radio station comprises register means for accumulating a timing error representing an accumulated difference between expected times of arrival of the synchronisation patterns and actual times of arrival of the synchronisation patterns, said timing error being accumulated during a predetermined time interval between reception of messages and before an expected reception of a next message, and the wireless radio station comprises means for at least substantially undoing the accumulated timing error before the expected reception of the next message by controlling the local timing circuitry in accordance with the accumulated timing error such that the timing error is compensated for just before the expected reception of the next message, said controlling of the local timing circuitry being performed within a first time period that is short with respect to a second time period between two successive messages, and said first time period ending at an instant before the expected reception of the next message, said instant being such that a ratio of a difference between said instant and a reception instant of a message preceding the next message, and of a difference between a reception instant of the next message and the reception instant of the message preceding the next message is substantially smaller than one.

10. In a digital wireless communication system comprising a first wireless radio station coupled to a network and a second wireless radio station arranged for wireless communication with the first wireless station through at least one time slot of a communication frame, said second wireless radio station being controllable so as to operate in an active reception mode and a power down mode, a method for undoing a timing error, said method being used in said second wireless radio station and said method comprising:

receiving messages comprising a synchronisation pattern;

adopting said power down mode between reception of messages;

accumulating a timing error representing an accumulated difference between expected times of arrival of said synchronisation patterns and actual times of arrival of said synchronisation patterns, during a predetermined time interval between reception of successive messages and before an expected reception of a next message; and at least substantially undoing said timing error before said expected reception of said next message such that said timing error is compensated before said expected reception of said next message, said undoing being performed within a first time period that is short with respect to a second time period between two successive messages, and said first time period ending at an instant before the expected reception of the next message, said instant being such that a ratio of a difference between said instant and a reception instant of a message preceding the next message, and of a difference between a reception instant of the next message and the reception instant of the message preceding the next message is substantially smaller than one.

11. A wireless radio station as claimed in claim 6, wherein a residual timing error is determined after a compensation step and after reception of a message, and is stored in the register means before further accumulation of the timing error to be compensated for before the next message.

12. A wireless radio station as claimed in claim 9, wherein a residual timing error is determined after a compensation step and after reception of a message, and is stored in the register means before further accumulation of the timing error to be compensated for before the next message.

13. A method as claimed in claim 7, determining a residual timing error after a compensation step and after reception of a message, and storing said residual timing error before further accumulation of the timing error to be compensated for before the next message.

14. A digital wireless communication system as claimed in claim 8, wherein a residual timing error is determined after a compensation step and after reception of a message, and is stored in the register means before further accumulation of the timing error to be compensated for before the next message.

15. A method as claimed in claim 10, determining a residual timing error is determined after a compensation step and after reception of a message, and storing said residual timing error before further accumulation of the timing error to be compensated for before the next message.

16. A wireless radio station as claimed in claim 6, wherein the means for undoing the accumulated timing error are configured to undo the accumulated timing error in a number of undoing steps.

17. A wireless radio station as claimed in claim 9, wherein the means for undoing the accumulated timing error are configured to undo the accumulated timing error in a number of undoing steps.

18. A method as claimed in claim 7, undoing the accumulated timing error in a number of undoing steps.

19. A digital wireless communication system as claimed in claim 8, wherein the means for undoing the accumulated timing error are configured to undo the accumulated timing error in a number of undoing steps.

20. A method as claimed in claim 10, undoing the accumulated timing error in a number of undoing steps.

* * * * *